Jan. 25, 1966 R. KORPMAN 3,231,419
METHOD OF MAKING A CURED TACKY AND PRESSURE-SENSITIVE
ADHESIVE TAPE
Filed July 2, 1962
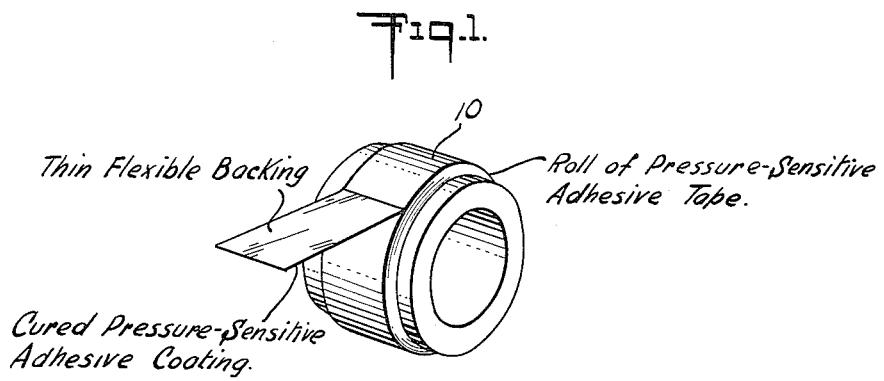
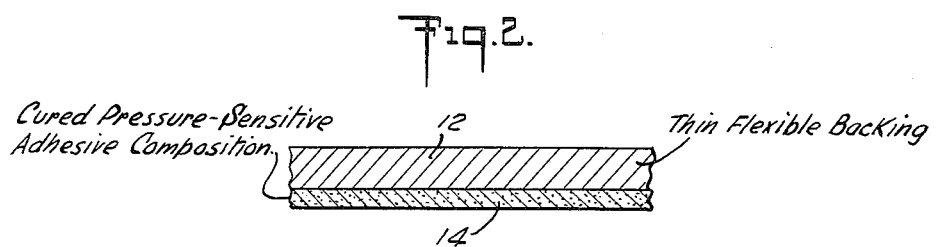
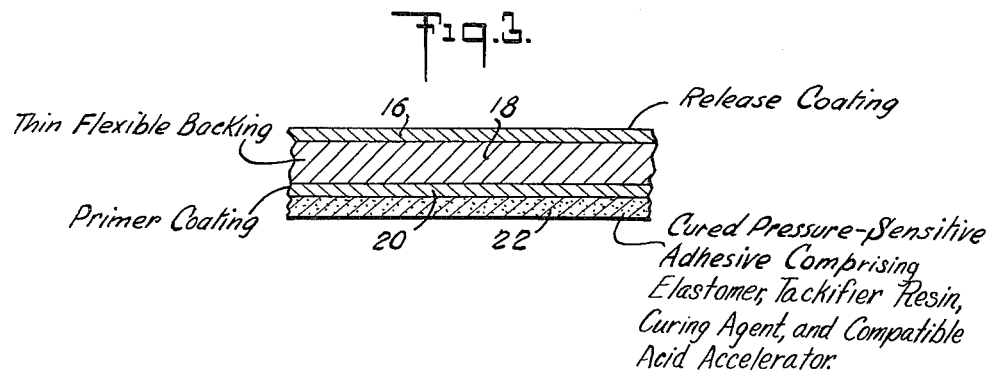
INVENTOR
RALF KORPMAN
BY
ATTORNEY 3,231,419
METHOD OF MAKING A CURED TACKY AND
PRESSURE-SENSITIVE ADHESIVE TAPE
Ralf Korpman, East Brunswick, N.J., assignor to Johnson & Johnson, a corporation of New Jersey
Filed July 2, 1962, Ser. No. 208,182
10 Claims. (Cl. 117—122)

This application is a continuation-in-part of my application Serial No. 99,443, filed on March 30, 1961, now abandoned.

This invention relates to an improvement in normally tacky and pressure-sensitive adhesive tape and in methods of making same. More particularly, the invention has to do with accelerating the cure of such tape.

The term "cure," in its various forms, as used in this specification and claims means the heat modification of a pressure-sensitive adhesive composition, as by cross-linking of the elastomeric component of such composition, so as to render the pressure-sensitive adhesive composition more resistant to elevated temperatures and to solvents while still retaining a balance of adhesion and cohesion properties enabling the composition to remain tacky and pressure-sensitive. The term cure as used herein is to be distinguished from the conventional use of this term as by the tire industry wherein the elastomer is heat modified to such an extent that the composition is converted to a high tensile, non-plastic, non-tacky state, i.e., the elastomer is substantially completely converted or heat-modified.

It has long been desired in the art to improve the dimensional stability, the solvent resistance, the elevated temperature resistance, and the aging properties of pressure-sensitive adhesive tape. Previous attempts to improve such characteristics have taken the form of employing curing agents for the elastomeric component of the adhesive composition, and curing the adhesive composition either prior to or after coating said adhesive on a backing. Cured normally tacky and pressure-sensitive adhesive tapes have also been found desirable because of the easy release characteristics of the adhesive facilitating unwinding a roll of tape when it is wound upon itself in roll form. Cured pressure-sensitive adhesive tapes have found particular application in masking and electrical insulating purposes.

These previous attempts have not been entirely successful. In many such cases the adhesive properties of the adhesive composition are substantially reduced so as to render the composition no longer tacky and pressure-sensitive. In those instances where adhesive composition is cured prior to coating on the backing, difficulties have been encountered either because insufficient cure is effected to obtain the desired characteristics or because too great a degree of cure is obtained so that the cured adhesive composition must be subjected to a physical working or mastication to sufficiently soften the mass and improve its solubility so as to enable it to be coated on a backing. In these instances, a finished tape having an adhesive possessing sufficient cure and solvent resistance is not obtained.

Problems have also been encountered in curing normally tacky and pressure-sensitive adhesive tapes wherein the curing step takes place after the adhesive composition is applied to the backing. Since the adhesive coated on the backing must remain normally tacky and pressure-sensitive, limited amounts of curing agents or lower curing temperatures or shorter curing periods have been employed. Use of such limited or very small amounts of curing agent may result in the adhesive composition remaining uncured, or may result in a lack of uniformity of the extent of cure from batch to batch. Increasing the amount of curing agent used often results in too complete a cure either during the curing cycle or upon aging with a consequent loss of tackiness and pressure-sensitivity. Reducing the curing temperatures, on the other hand, may result in incomplete cures. Also, reducing the curing temperatures required an impractical time period for effecting the cure. Increasing the curing temperatures is possible only within restricted limits circumscribed by the temperature above which the backing may be charred or otherwise degraded. Normally, temperatures below about 400° F. must be employed. Increased curing temperatures are especially disadvantageous on heat-sensitive backings such as thermoplastic non-fibrous films. In addition, curing is difficult to control at increased temperatures and, therefore, specially designed ovens may be required.

Another significant problem encountered in previous attempts to cure normally tacky and pressure-sensitive adhesive tapes has been in obtaining a compatible mixture of ingredients in the adhesive formulation. The term "compatible," as used herein and in the apended claims, means that each of the ingredients in the adhesive composition is intimately admixed with or sufficiently soluble, one in the other, so as to remain intimately admixed and dispersed without substantial separation or crystallization. If the ingredients of the adhesive composition are not compatible, loss of tack and pressure-sensitivity frequently results. Difficulties with respect to compatibility are magnified where relatively low temperatures are required because of the heat sensitivity of the backing. These difficulties are further multiplied in pressure-sensitive adhesive compositions in which the curing system includes not only the curing agent but an "accelerator" for the cure. The term "accelerator," as used herein and in the appended claims, means a material, compound or composition which is capable of decreasing the time period within which the desired cure is effected, or which is capable of permitting the desired cure to take place at reduced temperatures.

It is therefore a primary object of this invention to provide a normally tacky and pressure-sensitive adhesive tape which will overcome the foregoing difficulties. It is also an object to provide a normally tacky and pressure-sensitive adhesive tape which can be cured more economically and more conveniently.

Another object is to reduce the time and temperature required to cure an adhesive tape so as to render the adhesive coating on such tape resistant to elevated temperatures, aging, and solvents, while still retaining the tacky and pressure-sensitive qualities of such adhesive. It is a part of this object to reduce the time period and temperature required to effect such a cure without adversely affecting the backing and adhesive employed in the tape.

Other objects will be described in, or will be apparent from the following description.

I have found that the foregoing objects can be achieved by incorporating a small but effective amount of a compatible acid accelerator into normally tacky and pressure-sensitive adhesive compositions containing an oil-soluble heat and elastomer reactive formaldehyde resin curing agent of the type more fully described hereinafter. Normally tacky and pressure-sensitive adhesive tape comprising a thin flexible backing having at least one surface thereof coated with such an adhesive composition may preferably be cured to the desired degree in less than about two (2) minutes at a temperature of about 250° F. On the other hand, pressure-sensitive adhesive tapes made from similar adhesive compositions but not including such a compatible acid accelerator do not cure to the desired degree in more than about thirty (30) minutes at a temperature of about 250° F.

The accelerators which I have found to be useful in the practice of my invention should be acidic in character and compatible in the pressure-sensitive adhesive system. The accelerators must be sufficiently acidic, or acid forming, otherwise the desired decrease in curing time periods and curing temperatures cannot be obtained. Materials of neutral pH do not have the desired accelerating action.

The accelerators of the present invention must also be compatible with the other ingredients in the pressure-sensitive adhesive and the accelerator must remain so compatible after application to the tape backing and evaporation of the solvent used for the purpose of applying the adhesive to the backing. Generally, suitable compatibility of the accelerator may be determined by its solubility and dispersibility in aromatic hydrocarbon solvents such as xylene or toluene. The accelerator should be soluble or dispersible in such solvents at room temperature. Further, the accelerator should preferably be anhydrous and non-reactive with the ingredients in the pressure-sensitive adhesive composition other than the curing agent or the elastomeric component.

Some accelerators, for example para-toluene sulfonic acid or the alpha-sulfonated fatty acids having the general formula

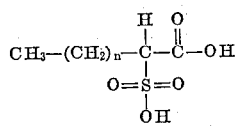

such as alpha-sulfopalmitic acid and alpha-sulfostearic acid, may somewhat decrease the time period required for the cure of pressure-sensitive adhesive compositions or tapes containing same. However, these accelerators are not sufficiently compatible by themselves with the ingredients in the pressure-sensitive adhesive composition and a loss of tack and pressure-sensitivity results. I have found that such accelerators may be rendered sufficiently compatible by dissolving such an accelerator in certain solvents.

Suitable solvents include phenols such as phenol, cresol, octylphenol, nonylphenol, dodecylphenol and the like; aliphatic alcohols such as methanol, ethanol, isopropyl alcohol, sec.-butyl alcohol, tert.-butyl alcohol, amyl and isoamyl alcohol, benzyl alcohol and n-octyl alcohol; dihydric alcohols such as ethylene glycol and propylene glycol; aliphatic ketones preferably having less than six carbon atoms, such as methyl ethyl ketone and cyclohexanone; esters such as methyl phthalyl ethyl glycollate (sold by the Monsanto Chemical Company as Santicizer M-17) and 2-ethylhexyl epoxy tallate (Flexol EP8) and the like. When employing some solvents, such as the phenols, it is preferred to first dehydrate the mixture of such solvent and the accelerator by heating the mixture, and then incorporate this dehydrated mixture into the adhesive composition.

Examples of suitable compatible acid accelerators which do not require the addition of a solvent include: (1) the mono- or di-esters of an aliphatic or aromatic alcohol and phosphoric anhydride such as phenyl acid phosphate, octyl-phenyl acid phosphate, butyl diacid phosphate, dibutyl acid phosphate and the like; (2) acid modified oil-soluble heat-reactive phenol-formaldehyde resins such as: (a) the reaction product of octylphenol-formaldehyde resin and para-toluene sulfonic acid—the reaction product containing about 1% sulfur by weight, (b) the reaction product of an alkylphenol-formaldehyde resin and sulfuric acid—the reaction product containing about 1% sulfur by weight, (c) the reaction product of an alkylphenol-formaldehyde resin and phosphoric acid—the reaction product containing about 1% phosphorus by weight, and (d) the reaction product of an alkylphenol-formaldehyde resin and chloromethyl phosphoric acid—the reaction product containing about 1% phosphorus by weight; and (3) the mixture of a non-compatible acid accelerator, such as para-toluene sulfonic acid, and a phenol such as phenol, cresol, octylphenol, nonylphenol, dodecylphenol and the like.

A further description of suitable compatible acid accelerators may be found in the examples given below.

The amount of the compatible acid accelerator employed in the pressure-sensitive adhesive composition may vary depending upon a variety of factors including the acidity of the particular accelerator used, the nature of the other ingredients in the adhesive composition, the degree of cure required, the curing temperature required as by the nature of the backings, and the curing time period desired. Generally, the acid accelerator (not including any solvent which may be used with the acid component of the compatible acid accelerator) will be incorporated in an amount of from about 0.5 to 30 parts by weight per 100 parts by weight of the total solids in the adhesive composition. For most purposes it is preferred to use from about 1 to 15 parts by weight of the acid accelerator per 100 parts of the total solids in the adhesive composition.

The pressure-sensitive adhesive composition with which any of the foregoing compatible acid accelerators, or a combination of such accelerators, may be used may be one of the various rubber-resin type pressure-sensitive tape adhesives. The adhesive composition would comprise: (1) an aldehyde resin reactive elastomer; (2) a tackifier; (3) a curing agent; and (4) a compatible acid accelerator. The adhesive composition after cure should have a proper balance of properties of adhesion and cohesion to enable it to stick to surfaces to which applied by hand pressure only and to be removed from such surfaces without offsetting of the adhesive.

The elastomeric component provides the adhesive composition with cohesion and elastic properties. The elastomer may be any aldehyde resin reactive elastomer such as, a natural rubber, such as wild rubber, plantation rubber (smoked sheets), crepe rubber, reclaimed rubber; a synthetic rubber, such as the Buna-S type rubbers (elastomeric copolymers of butadiene and styrene), Buna-N type rubbers (elastomeric copolymers of butadiene and acrylonitrile), neoprene rubbers (elastomeric polymers of 2-chloro-1,3-butadiene), butyl rubber (elastomeric copolymers of isobutylene and small amounts of diolefins), polymers of acrylic acid esters, such as aldehyde resin reactive elastomeric interpolymers of 2-ethylhexyl acrylate and allyl acrylate; or combinations of two or more of any such aldehyde resin reactive elastomers.

The elastomeric component is modified by blending with a tackifier resin which serves to increase the tackiness or adhesive qualities of the composition. Suitable tackifier resins are well recognized in the art. They may be either solid or liquid. The tackifier resins which may be used include polymerized terpene resins, such as polymerized beta-pinene resins having a melting point varying from 10° C.–125° C. (e.g. the "Piccolyte" resins sold by The Pennsylvania Industrial Chemical Corporation), coumarone-indene resin (e.g. "Cumar" resins sold by the Barrett Division of Allied Chemical and Dye Corporation or "Neville" resins sold by Neville Company—for a further description see also U.S.P. 2,319,959); esters of hydrogenated rosins (e.g. "Staybellite" esters sold by the Hercules Powder Company), chlorinated paraffins (e.g. "Paroil" sold by Dover Chemical Company), epoxy resins formed for example by the condensation of bisphenol-A and epichlorohydrin (e.g. "Araldite 6005" sold by Ciba Company, Inc.; Araldite 6005 is the condensation product of epichlorohydrin and bisphenol-A and has an epoxy equivalent of 0.52 per 100 grams of resin)—the epoxy tackifying resins are preferably used with the more polar elastomers such as Buna N rubbers; liquid polyisobutylene resins (e.g. "Vistac #1" sold by Advance Solvents & Chemicals Corp.), dehydroabietic acid (e.g. "Galex" sold by National Rosin Oil & Size Co., "Gorite" sold by Synthetic Products Co., and "Nilox" sold by Heyden-Newport Corporation), diethylene glycol ester of dehydroabietic acid, and glycerol ester of dehydroabietic acid ("Gorite Ester 100" sold by Synthetic Products Co.), hydrocarbon resins derived from petroleum (e.g. "Panarez" resins sold by Amoco Chemicals Corporation). A further description of suitable liquid tackifier resins may be found in my copending application Serial Number 2,450 filed on January 14, 1960, now United States Letters Patent No. 2,999,653. The amount of tackifier resin employed will depend on a variety of factors including the specific ingredients in the formulation, the amount of tack and "quick-stick" desired, the nature of the elastomer employed and the total adhesion desired. Generally, the tackifier resin will vary between about 20 to 300 parts by weight of such resin to 100 parts by weight of the elastomer. When a solid tackifier resin is used the proportions generally are between 20 to 125 parts by weight of such resin per 100 parts by weight of the elastomer, and with liquid tackifier resins the proportions may vary between 20–300 parts by weight of such resin to 100 parts by weight of the elastomer. It is preferred for many applications to use between about 30 to 100 parts by weight of a solid tackifier resin for 100 parts by weight of the elastomer or between 40 to 200 parts by weight of a liquid tackifier resin for 100 parts by weight of the elastomer.

The curing agents useful in the practice of this invention include the oil soluble heat and elastomer reactive formaldehyde resins such as the alkylphenol-formaldehyde resins, the urea-formaldehyde-alcohol condensates and mixtures thereof. The oil-soluble heat and elastomer reactive resins of alkylphenol-formaldehyde may be prepared by well known methods as by reacting 1.1–2.0 mols of formaldehyde with 1 mol of an alkylphenol with an alkaline catalyst, e.g. as further described in U.S.P. 2,410,053 and 2,963,387. A preferred example of such an alkylphenol-formaldehyde resin is the octylphenol-formaldehyde resin sold under the trademark "Amberol ST–137" by Rohm & Haas Company and under the trademark "Schenectady 1045" by the Schenectady Varnish Company. Suitable urea-formaldehyde-alcohol condensates include the oil-soluble heat and elastomer reactive condensates of urea, formaldehyde and an alcohol. Such resins may be prepared by reacting urea and formaldehyde in the presence of an alcohol, preferably a monohydric alcohol such as butanol, 2-ethyl-hexanol, octanol, and capryl alcohol. Typical procedures for the preparation of these oil-soluble heat and elastomer reactive urea-formaldehyde-alcohol condensates are further described in U.S.P. 2,171,882; U.S.P. 2,293,164; and U.S.P. 2,386,744. An example of such a resin is that sold by the Rohm & Haas Company under the trademark "Uformite F–200 E." The amount of curing agent employed will depend on a variety of factors including the compatibility of the curing agent with the elastomer, the extent of cure desired, etc. Generally, the amount of curing agent may vary between about 2 to 30 parts by weight per 100 parts by weight of the total solids in the adhesive composition. If substantially less than 2 parts of curing agent is used little or no cure is obtained. Preferably, from about 4 to 15 parts by weight of curing agent is used per 100 parts by weight of the total solids in the adhesive composition.

In addition to the foregoing components of the pressure-sensitive adhesive compositions other additives may be incorporated. These further additives should preferably be non-basic to prevent their adverse interference with the compatible acid accelerator. These additives may include pigments such as carbon black, titanium dioxide, etc. for reinforcement of the adhesive or imparting color to the adhesive; fillers such as various silicates; antioxidants; and metal chelating agents.

In preparing the normally tacky pressure-sensitive adhesive tapes of this invention, the pressure-sensitive adhesive composition formulated as described above is applied to a thin, flexible backing and the thus coated backing is cured at elevated temperatures less than the temperature at which the backing is adversely affected and preferably at less than 275° F. for the required time to effect the cure. In most instances the tape can be cured in less than two minutes at a temperature of about 250° F. The pressure-sensitive adhesive mass may be applied to the backing by any of the conventional standard techniques such as direct and reverse roll, rubber roll and knife, or knife and rubber blanket. The adhesive composition is generally coated in an amount of from about 0.5 to 5.0 ounces per square yard of backing.

The backing used must be thin and flexible to enable the adhesive coated tape to be wound upon itself in roll form and to conform to surfaces to which the tape is applied. The backing may be any of a wide variety of materials. It may be a non-fibrous film, or a fibrous material, or combinations thereof. Suitable non-fibrous films include: ethyl cellulose, regenerated cellulose, cellulose acetate, cellulose acetate-butyrate, cellulose propionate, polyvinylidene chloride-vinyl chloride and/or acrylonitrile polymers such as "Saran," vinyl chloride polymers such as polymers of vinyl chloride and vinyl acetate, polyethylene, polypropylene, polyhaloethylenes such as chlorinated polyethylene, polytetrafluoroethylene and polytrifluoromono-chloroethylene, polyvinyl alcohol, polyamides of the nylon type, polymers of styrene such as polymers of styrene and acrylonitrile, polyvinyl acetals such as polyvinyl butyral, polyesters such as "Mylar" or metalized "Mylar," and metallic films such as aluminum, copper, lead, iron, and zinc foils. The non-fibrous films may be molecularly oriented in one or more directions if desired. Suitable fibrous backings include: fibrous webs composed of polyamide (nylon), asbestos, polyester ("Dacron"), cotton, linen, rayon, glass, glassine, paper, impregnated or unified paper, rope paper, non-woven fibers bonded at intervals adhesively and any other coated, impregnated or treated fibrous woven or nonwoven backings.

If desired, a primer coating may be interposed between the thin flexible backing and the pressure-sensitive adhesive mass to more firmly secure said adhesive to said backing. The particular primer coating selected will depend upon the nature of the backing and the nature of the specific pressure-sensitive adhesive mass employed. For hydrophilic film backings a primer such as that disclosed in U.S. Patents 2,328,066 or 2,340,298 may be employed. For hydrophobic backings the primer disclosed in U.S.P. 2,647,843 would be preferred.

For ease in unrolling the tape, it is sometimes desirable to provide upon the surface of the backing opposite that to which the pressure-sensitive adhesive composition is applied, a coating which decreases the adhesion of the adhesive mass to the face surface of the tape. Such coatings are commonly known as release coatings. Any suitable conventionally employed release coating may be employed as, for example, a lacquer and a surface-active material of the type disclosed in U.S.P. 2,646,371 or a release coating of the kind described in U.S.P. 2,913,355 or 2,914,167.

Reference is now made to the drawing illustrating by way of example an embodiment of the invention and wherein:

FIG. 1 is a perspective view of a roll 10 of normally tacky and pressure-sensitive adhesive tape and in accordance with this invention having a thin flexible backing and a cured normally tacky and pressure-sensitive mass coated on at least one surface of said backing.

FIG. 2 is a vertical view of a strip of tape from the roll of FIG. 1.

FIG. 3 is a vertical sectional view of a further embodiment of this invention showing a cross-section of a more sophisticated tape.

Referring more particularly to the drawing there is illustrated in FIGS. 1 and 2 a roll of normally tacky and pressure-sensitive tape having a thin flexible backing 12 and a cured pressure-sensitive adhesive composition 14 applied to one surface of said backing. FIG. 3 illustrates the more sophisticated structure in which a low-adhesion release coating 16 is coated on one surface of a thin flexible backing 18 and a primer composition 20 is coated on the opposite surface of said backing to firmly secure said backing to the overlying coating of a cured pressure-sensitive adhesive composition 22.

By way of introducing the following specific examples which are furnished to aid the understanding of the invention and not to limit its scope, reference is made hereafter to specific compatible acid accelerators which were made as follows:

Compatible acid accelerator 1

A mixture of para-toluene sulfonic acid and cresol was made by charging 25 grams of para-toluene sulfonic acid and 75 grams of cresol into a 500 ml. flask. The mixture was heated with continuous stirring at 150° F. for 30 minutes. The mixture was cooled and was ready for use in compounding pressure-sensitive adhesive compositions.

Compatible acid accelerator 2

A 5 liter flask fitted with a stirrer, condenser, and a thermometer was charged with 1339 grams (6.5 mols) of octylphenol and 650 mls. (8.125 mols) of formalin (35%–40% formaldehyde). The mixture was heated to about 60° C. and stirred until a solution was formed. Then the catalyst, 13.65 grams of 98% NaOH dissolved in water (1% based on phenol), was added. The mixture was further heated to a reflux temperature of 95° C. and held at constant reflux for one hour. The reaction mixture was cooled slightly and 25 mls. of acetic acid was stirred in. The mixture was then washed three times with 1½ liters of water for each washing and then heating was continued at 60° C. To dehydrate the mixture, it was heated quickly to 150° C. (approximately 1 hour was required to reach this temperature). Carbon dioxide was then bubbled through the reaction mixture at 85° C. to 150° C. and further carbon dioxide bubbling was carried on at 150° C.–155° C. for 30 minutes while stirring vigorously. All openings in the flask were free to permit the vapors to escape. At this point 44.1 grams of para-toluene sulfonic acid was added and the heating, stirring and $CO_2$ bubbling continued until the temperature had reached 137° C. (about 15 minutes). The product, on cooling, was a brittle solid readily soluble in toluene. The product was ready for incorporation in pressure-sensitive adhesive compositions.

Compatible acid accelerator 3

This accelerator was prepared in the same manner as compatible acid accelerator 2 described above, except that sulfuric acid was substituted for para-toluene sulfonic acid and 25.1 grams of sulfuric acid was added. The product contained 1% sulfur.

Compatible acid accelerator 4

This accelerator was prepared in the same manner as compatible acid accelerator 2 described above, except that phosphoric acid was substituted for para-toluene sulfonic acid and 24.3 grams of phosphoric acid was added. The product contained 1% phosphorus.

Compatible acid accelerator 5

This accelerator was prepared in the same manner as compatible acid accelerator 2 described above, except that chloromethyl phosphoric acid was substituted for para-toluene sulfonic acid and 33.2 grams of chloromethyl phosphoric acid was added. The product contained 1% phosphorus.

Compatible acid accelerator 6

This accelerator was prepared in the same manner as described above for compatible acid accelerator 1, except that bisphenol-A was substituted for cresol.

Compatible acid accelerator 7

This accelerator was prepared in the same manner as described above for compatible acid accelerator 1, except that phenol was substituted for cresol.

Compatible acid accelerator 8

This accelerator was prepared in the same manner as described above for compatible acid accelerator 1, except that nonyl-phenol was substituted for cresol.

Compatible acid accelerator 9

This accelerator was prepared in the same manner as described above for compatible acid accelerator 1, except that dodecyl-phenol was substituted for cresol.

Compatible acid accelerator 10

This accelerator was phenyl acid phosphate having the structural formula reproduced below:

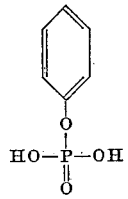

It is a commercially available compound.

Compatible acid accelerator 11

This accelerator was octyl-phenyl acid phosphate having the structural formula:

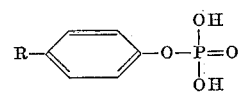

wherein R is an octyl group. This accelerator is commercially available.

Examples I–XX

The following table of examples illustrates various normally tacky and pressure-sensitive adhesives compounded in accordance with the present invention. In each example the normally tacky and pressure-sensitive adhesive was compounded as follows:

The elastomer or combination of elastomers was mixed with the reinforcing pigment or filler or antioxidant (if any) in a rubber mill or Banbury mixer to form a base. This base was then dissolved in toluene and mixed in a vessel with the curing agent and tackifier resin until a homogeneous solution was formed. At that point the compatible acid accelerator was added.

The resultant adhesive mass was then knife coated on a thin flexible backing, i.e. a polyester film "Mylar" 1 mil thick, in a mass weight of 1 ounce per square yard. The normally tacky pressure-sensitive adhesive mass coated tape was cured at 250° F. One minute or less was the time required to obtain the desired cure. After curing, the adhesive mass was tacky, pressure-sensitive, and insoluble in toluene. When the cured adhesive tape was applied to a glass surface and then removed, no evidence of a blush remained on the glass surface. Therefore, the ingredients in the mass were compatible.

The Roman numerals heading each column represent the example number and the Arabic numerals in the column are the parts by weight of the ingredients listed in the first column.

The compatible acid accelerators identified by Arabic numerals refer to the accelerators previously described and similarly identified.

| List of Ingredients | Examples | | | | | | | | | |
|---|---|---|---|---|---|---|---|---|---|---|
| | I | II | III | IV | V | VI | VII | VIII | IX | X |
| Pale Crepe Rubber | | 100 | 100 | | 100 | 100 | 100 | 100 | 100 | 100 |
| Buna-N Rubber (Hycar 1072) | 100 | | | | | | | | | |
| Neoprene Rubber (Neoprene WRT) | | | | 100 | | | | | | |
| Chlorinated Paraffin (Paroil HV) | 30 | | | | | | | | | |
| Polyterpene Resin (Piccolyte S-10) | | 50 | 50 | 20 | 100 | 50 | | | 50 | 50 |
| Polyterpene Resin (Piccolyte S-25) | | | | | | | 50 | | | |
| Hydrocarbon Resins (Panarez 12-210) | | | | | | | | 50 | | |
| Silicate Filler (ASP 600 sold by Minerals & Chemicals, Inc.) | | | | | | 50 | | | | |
| Octylphenol-formaldehyde Resin (Amberol ST-137) | 25 | 20 | 20 | 20 | 20 | 20 | 20 | 20 | 20 | 20 |
| Accelerator #1 | | | 10 | 7.5 | 7.5 | | | | | |
| Accelerator #2 | 25 | | | | | | | | 25 | 30 |
| Accelerator #6 | | | | | | | | | | 5.0 |
| Accelerator #10 | | 7.5 | | | | 5.0 | 5.0 | | | |

| List of Ingredients | Examples | | | | | | | | | |
|---|---|---|---|---|---|---|---|---|---|---|
| | XI | XII | XIII | XIV | XV | XVI | XVII | XVIII | XIX | XX |
| Pale Crepe Rubber | 100 | 100 | 100 | 100 | 100 | | | 100 | 50 | 100 |
| GRS-Rubber (78.5% Butadiene; 22.5% Styrene—Mooney Viscosity 55) | | | | | | | | | 50 | |
| Buna-N Rubber (Hycar 1072) | | | | | | 100 | 100 | | | |
| Diethylene Glycol Ester of Dehydroabietic Acid | | | | | | | | 150 | | |
| Polyterpene Resin (Piccolyte S-10) | 50 | 50 | 50 | | 50 | | | | | |
| Polyterpene Resin (Piccolyte S-25) | | | | 35 | | | | | | |
| Glycerol Ester of Dehydroabietic Acid (Gorite Ester 100) | | | | | | | | | 150 | 150 |
| Epoxy Resin (Araldite 6005) | | | | | | 150 | 150 | | | |
| Titanium Dioxide | | | | 50 | | | | | | |
| Octylphenol-formaldehyde Resin (Amberol ST-137) | 20 | 20 | 20 | 20 | | 20 | | | | 15 |
| Urea-formaldehyde-alcohol Condensate (Uformite F-200E) (dry weight) | | | | | 20 | 10 | | | | 12 |
| Urea-formaldehyde-alcohol Condensate (Uformite F-226E) (dry weight) | | | | | | | 10 | | 10 | |
| Urea-formaldehyde-alcohol Condensate (Uformite F-240N) (dry weight) | | | | | | | | 10 | | |
| Accelerator #1 | | | | 10 | 10 | 10 | 10 | 10 | 10 | 10 |
| Accelerator #7 | 7.5 | | | | | | | | | |
| Accelerator #8 | | 7.5 | | | | | | | | |
| Accelerator #9 | | | 7.5 | | | | | | | |

*Examples XXI–XXII*

Pressure-sensitive adhesive compositions were prepared as in the previous examples with the formulation shown in the table below and subjected to elevated temperature of 250° F. to effect a cure.

| Ingredients and Curing Conditions | Parts by Weight | |
|---|---|---|
| | Example XXI | Example XXII |
| Pale Crepe Rubber | 100 | 100 |
| Octylphenol-formaldehyde resin (Amberol ST-137) | 20 | 20 |
| Mixture of— | | |
| p-Toluene sulfonic acid | 2.5 | 2.5 |
| Cresol | 7.5 | 0.0 |
| Polyterpene-tackifier resin (Piccolyte S-40) | 40 | 40 |
| Curing Temperature, °F | 250 | 250 |
| Curing Time (minutes) | 1 | >30 |

A comparison between the cures obtainable by the present invention and the prior art is shown in Examples XXI and XXII above. Example XXI represents the present invention. Example XXII is the prior art. Use of a compatible acid accelerator of the present invention permits a cure within 1 minute at a curing temperature of 250° F. The prior art composition required 30 minutes to effect a cure. In addition the products of the present invention contained a pressure-sensitive adhesive composition that was clear and satisfactory in appearance whereas the prior art product was cloudy and unsatisfactory in appearance.

*Examples XXIII–XXV*

A further demonstration of the improvements obtainable by the practice of the present invention is shown by a comparison of Examples XXIII through XXV.

Pressure-sensitive adhesive compositions were prepared as in Examples I–XX, above, in accordance with the formulation shown in the table below. The pressure-sensitive adhesive mass was subjected to a curing action at a temperature of 250° F. and the time in minutes required to effect the desired cure was recorded. The numbers given in the column headed by the example number are the parts by weight of the ingredient listed in the first column.

| Ingredients and Curing Time | Examples | | |
|---|---|---|---|
| | XXIII | XXIV | XXV |
| Pale Crepe Rubber | 100 | 100 | 100 |
| Octylphenol-formaldehyde resin (Amberol ST-137) | 20 | 20 | |
| Phenyl acid phosphate | 7.5 | | 7.5 |
| Piccolyte S-25 | 40 | 40 | 40 |
| Curing Time (minutes) | 1 | 60 | (¹) |

¹ Not cured in 90 minutes.

Example XXIV shows that prior art adhesives without a compatible acid accelerator cure in 60 minutes as compared to Example XXIII of the present invention which cures in one minute. Example XXV shows that the compatible acid accelerator itself does not cure the adhesive but acts merely as an accelerator for the formaldehyde resin curing agent.

*Examples XXVI–XXXVI*

The following table of examples still further illustrate the results obtainable by the present invention.

determined by dropping the adhesive surface of the tape sample on a clear glass plate without additional pressure and observing the force necessary to detach the tape from the glass plate.

Examples XXVI and XXXIV are controls presented here for purpose of comparison.

| Formulation | Examples | | | | | |
|---|---|---|---|---|---|---|
| | XXVI | XXVII | XXVIII | XXIX | XXX | XXXI |
| Pale Crepe Rubber | 100 | 100 | 100 | 100 | 100 | 100. |
| Polyterpene Resin (Piccolyte S-70) | 70 | 70 | 70 | 70 | 70 | 70. |
| Octyl phenol-formaldehyde Resin (Amberol ST-137) | 20 | 20 | 20 | 20 | 20 | 20. |
| p-Toluene sulfonic acid | 2.5 | 2.5 | 2.5 | 2.5 | 2.5 | 2.5. |
| Isopropyl alcohol | | 2.5 | | | | |
| n-Octyl alcohol | | | 2.5 | | | |
| Methyl phthalyl ethyl glycollate | | | | 2.5 | | |
| 2-ethylhexyl epoxy tallate | | | | | 2.5 | |
| Ethylene glycol | | | | | | 2.5. |
| Methyl ethyl ketone | | | | | | |
| Cyclohexanone | | | | | | |
| α-sulfopalmitic acid | | | | | | |
| α-sulfostearic acid | | | | | | |
| n-Amyl alcohol | | | | | | |
| Adhesive clarity; uncured | Scattered crystals. | Cloudy | Cloudy | Clear some crystals. | Slightly scattered crystals. | Slightly cloudy. |
| Adhesive clarity; cured | Spotty dark amber. | Clear amber | Clear amber | Clear amber | Clear light amber. | Clear dark amber. |
| Curing Time (seconds) | 360 | 20 | 30 | 45 | 60 | 30. |
| Adhesion to Steel (ounces) | 10 | 24 | 32 | 25 | 40 | 18. |
| 20° Hold to Chrome (minutes) | 0 | 12 | 4 | 9 | 3 | 3. |
| Quick Stick | Good | Excellent | Excellent | Excellent | Very good | Very good. |

| Formulation | Examples | | | | |
|---|---|---|---|---|---|
| | XXXII | XXXIII | XXXIV | XXXV | XXXVI |
| Pale Crepe Rubber | 100 | 100 | 100 | 100 | 100. |
| Polyterpene Resin (Piccolyte S-70) | 70 | 70 | 70 | 70 | 70. |
| Octyl phenol-formaldehyde Resin (Amberol ST-137) | 20 | 20 | 20 | 20 | 20. |
| p-Toluene sulfonic acid | 2.5 | 2.5 | | 2.5 | |
| Isopropyl alcohol | | | | | |
| n-Octyl alcohol | | | | | |
| Methyl phthalyl ethyl glycollate | | | | | |
| 2-ethylhexyl epoxy tallate | | | | | |
| Ethylene glycol | | | | | |
| Methyl ethyl ketone | 2.5 | | | | |
| Cyclohexanone | | 2.5 | | | |
| α-sulfopalmitic acid | | | | 2.5 | 2.5. |
| α-sulfostearic acid | | | | | 2.5. |
| n-Amyl alcohol | | | | | |
| Adhesive clarity; uncured | Cloudy | Very cloudy | Clear | Clear | Clear. |
| Adhesive clarity; cured | Clear amber | Clear amber | Clear light yellow | Clear amber | Clear light amber. |
| Curing Time (seconds) | 6 | 20 | No cure after 1 hour. | 30 | 12. |
| Adhesion to Steel (ounces) | 24 | 25 | 22 | 30 | 24. |
| 20° Hold to Chrome (minutes) | 3 | 7 | 18 (mass split) | 19 | 10. |
| Quick Stick | Very good | Very good | Fair | Excellent | Excellent. |

Pressure-sensitive adhesive compositions were prepared as in Examples I–XX, above. The adhesive compositions were then knife coated on a 1 mil thick polyester (Mylar) film backing in a mass weight of 1 ounce per square yard. The adhesive coated tape was cured at 260° F. for the time required to obtain the desired cure, i.e. until the adhesive mass was insoluble in toluene.

The numbers given in the column headed by the example number are the parts by weight of the ingredient listed in the first column.

The results obtained are also tabulated. Adhesive clarity was determined by visual examination of the adhesive, both before and after curing. The curing time is recorded in seconds. Adhesion to steel is expressed as the force necessary, in ounces, required to remove a one inch wide test sample piece of tape from a polished steel surface at a 180° angle at the rate of 12 inches per minute. The measurement of 20° hold to chrome was made by applying a test sample of tape to a chrome steel bar so that the tape strips from the bar at an angle of 20° from the vertical. A 400 gram weight is attached to the end of the test tape sample, and the time in minutes is recorded for the tape to fall from the bar. Quick stick was

*Example XXXVII*

A 450 gauge cellophane film is primed with a composition comprising 1 part polyvinyl alcohol and 2 parts GRS rubber latex.

The primed surface is coated with 1 ounce per square yard (dry weight) of the following pressure-sensitive adhesive composition:

| Ingredient: | Parts by weight |
|---|---|
| Polyisoprene rubber (Shell 305) | 100 |
| Dehydroabietic acid | 30 |
| Phenol modified polyterpene resin, M.P. 180° F., Spec. Grav. 1.00, Color N–X (Sold as Schenectady Resin #566) | 40 |
| Urea-formaldehyde resin (Sold by Rohm & Haas as Uformite 240N, in a 50% solids solution in naphtha) | 1.0 |
| Ditertiary amyl hydroquinone | 2.0 |
| P-toluene sulfonic acid | 1.0 |
| Isopropyl alcohol | 1.0 |

The above described adhesive composition is dispersed in an aliphatic solvent, heptane, and reverse roll coated on the cellophane film. The coated sheet is dried, cured, slit and wound in roll form. The tape has very good "quick-stick," adhesion to steel, clarity and age stability.

It will be appreciated that many variations in the invention described herein may become apparent to those skilled in the art to which this invention applies. It also is to be appreciated that such variations are within the concept of the invention described herein and the invention is to be considered limited only by the appended claims.

What is claimed is:

1. A method of making a cured normally tacky and pressure-sensitive adhesive tape comprising applying a coating of an adhesive composition on at least one major surface of a thin flexible backing; drying said coated backing; and curing the adhesive coated backing in less than about 2 minutes at a temperature below that temperature at which said backing is adversely affected; said adhesive composition comprising an aldehyde resin reactive elastomer, a tackifier resin compatible with said elastomer in an amount of from about 20 to 300 parts by weight per 100 parts by weight of elastomer, an oil-soluble heat and elastomer reactive formaldehyde resin curing agent in an amount of from 2 to 30 parts by weight per 100 parts by weight of the total solids in the adhesive composition, a primary solvent for the adhesive composition, and from about 0.5 to 30 parts by weight per 100 parts per weight of total solids in the adhesive composition of a compatible strong acid accelerator selected from the group consisting of:
   (a) a mixture of a sulfonic acid accelerator substantially insoluble in said primary solvent and a secondary solvent for said accelerator, said secondary solvent also being compatible with the remainder of the adhesive composition,
   (b) an oil soluble organic acid phosphate soluble in the primary solvent, and
   (c) a non-elastomer-reactive acid modified formaldehyde resin soluble in the primary solvent.

2. A method of making an adhesive tape according to claim 1, wherein the compatible acid accelerator comprises an aryl acid phosphate.

3. A method of making an adhesive tape according to claim 2, wherein the compatible acid accelerator comprises phenyl acid phosphate.

4. A method of making an adhesive tape according to claim 1, wherein the compatible acid accelerator comprises the reaction product of a phenolformaldehyde resin and a strong acid.

5. A method of making a cured normally tacky and pressure-sensitive adhesive tape comprising applying a coating of an adhesive composition on at least one major surface of a thin flexible backing; drying said coated backing; and curing the adhesive coated backing in less than about 2 minutes at a temperature below that temperature at which said backing is adversely affected; said adhesive composition comprising an aldehyde resin reactive elastomer and a tackifier resin compatible with said elastomer in an amount of from about 20 to 300 parts by weight per 100 parts by weight of elastomer, an oil-souble heat and elastomer reactive formaldehyde resin curing agent in an amount of from 2 to 30 parts by weight per 100 parts by weight of the total solids in the adhesive composition, a primary solvent for the adhesive composition, and from about 0.5 to 30 parts by weight per 100 parts per weight of total solids in the adhesive composition of a compatible strong acid accelerator comprising a mixture of a sulfonic acid accelerator substantially insoluble in said primary solvent and a secondary solvent for said accelerator, said secondary solvent also being compatible with the remainder of the adhesive composition.

6. A method of making an adhesive tape according to claim 5, wherein the acid accelerator comprises an alpha-sulphonated fatty acid.

7. A method of making an adhesive tape according to claim 6, wherein the compatible acid accelerator comprises a mixture of an alphasulfonated palmitic acid and a saturated aliphatic alcohol.

8. A method of making an adhesive tape according to claim 5, wherein the compatible acid accelerator comprises a mixture of para-toluene sulfonic acid and an aliphatic alcohol.

9. A method of making an adhesive tape according to claim 8, wherein the aliphatic alcohol comprises isopropyl alcohol.

10. A method of making an adhesive tape according to claim 5, wherein the compatible acid accelerator comprises a mixture of para-toluene sulfonic acid and a phenol.

References Cited by the Examiner

UNITED STATES PATENTS

| | | | |
|---|---|---|---|
| 2,601,016 | 6/1952 | Hendricks et al. | 117—122 |
| 2,964,422 | 12/1960 | Bergstedt et al. | 117—122 |
| 2,999,769 | 9/1961 | Korpman | 117—122 |
| 3,000,847 | 9/1961 | Graham | 260—43 |

FOREIGN PATENTS

| | | |
|---|---|---|
| 217,097 | 1/1957 | Australia. |
| 574,830 | 4/1959 | Canada. |
| 848,455 | 9/1960 | Great Britain. |

WILLIAM D. MARTIN, *Primary Examiner.*

RICHARD D. NEVIUS, MURRAY KATZ, *Examiners.*